United States Patent [19]
Hoshino et al.

[11] Patent Number: 6,061,122
[45] Date of Patent: May 9, 2000

[54] OPTICAL IDENTIFICATION SYSTEM USING CHOLESTERIC LIQUID CRYSTALS

[75] Inventors: Hidekazu Hoshino; Itsuo Takeuchi; Seiya Shibuya, all of Yokohama, Japan

[73] Assignees: NHK Spring Co., Ltd.; Nippon Mitsubishi Oil Corporation, both of Japan

[21] Appl. No.: 09/123,512

[22] Filed: Jul. 28, 1998

[30] Foreign Application Priority Data

Jul. 29, 1997 [JP] Japan ..................................... 9-203135
Nov. 20, 1997 [JP] Japan ..................................... 9-319566

[51] Int. Cl.[7] .................................................... G06K 9/74
[52] U.S. Cl. ............................................ 356/71; 250/556
[58] Field of Search ................................ 356/71; 250/556

[56] References Cited

U.S. PATENT DOCUMENTS 4,514,085  4/1985  Kaye ........................................ 356/71
4,536,014  8/1985  Boutaleb et al. ......................... 356/71
5,200,794  4/1993  Nishiguma et al. .

*Primary Examiner*—Frank G. Font
*Assistant Examiner*—Amanda Merlino
*Attorney, Agent, or Firm*—Marger Johnson & McCollom, P.C.

[57] ABSTRACT

Provided is an economical identification system suitable for use on commercial products which is difficult to duplicate, and highly identifiable. The system includes an identification medium having a high-polymer cholesteric liquid crystal material applied thereon. The high-polymer cholesteric liquid crystals selectively reflect a certain wavelength, and this wavelength changes with the change in the incident angle of the light. The liquid crystals also have the property to circularly polarize the reflected light in either sense. By taking advantages of such properties, it is possible to provide a highly identifiable structure which, however, is highly difficult to illicitly duplicate. In particular, by forming the reflective layer of a hologram with high-polymer cholesteric liquid crystals, the hologram can be used as an identification medium which is highly difficult to duplicate but easy to identify with a machine.

19 Claims, 10 Drawing Sheets

OPTICAL IDENTIFICATION SYSTEM USING CHOLESTERIC LIQUID CRYSTALS

TECHNICAL FIELD

The present invention relates to an identification system for preventing forgery of two-dimensional and three-dimensional articles such as passports, cards, security notes, gift certificates, pictures, public transportation tickets, betting tickets, and various commercial goods, and in particular to an identification system for verifying the authenticity of an article by visually or mechanically recognizing a identification medium affixed to the article.

BACKGROUND OF THE INVENTION

Conventionally, it has been widely practiced to prevent the forgery of cards and security notes by using the system of affixing a hologram onto the object, and visually verifying it. It has also been proposed to use a hologram having a prescribed diffractive property to verify the authenticity of the article. To prevent the uncertainty associated with the visual identification, a light beam of a prescribed wavelength may be impinged upon the hologram so that the authenticity of the article may be verified by detecting the direction of the diffracted light. For such an identification system, reference should be made to U.S. Pat. No. 5,200,794 assigned to the common assignee. The contents of this prior patent is hereby incorporated in this application by reference.

However, due to the recent popularization of the technology of preparing hologram, the hologram technology has become so readily available that illicit duplication of hologram which is hardly distinguishable from an authentic hologram can now be made without any significant difficulty. In other words, the hologram has become less effective in discouraging illicit duplication. Other technologies for preventing forgery are known, but are so costly that they are not suitable for use on common commercial goods. Thus, there is a need for a novel technology for preventing forgery.

Cholesteric liquid crystals normally have a layered structure, and the axial direction of the molecules in each layer are parallel to each other as well to the plane of each layer. Each layer is slightly twisted relative to the adjacent layer so that a three-dimensional spiral structure is produced. This structure demonstrates the property to selectively reflect a circularly polarized light having a wavelength of $\lambda$ which is given by $\lambda = n \cdot p$ where p is the depth of the layers for this axial direction to turn 360 degrees or the pitch, and n is the average index of refraction of each layer. Therefore, if the direction of the liquid crystals in each layer turns counter-clockwise with respect to the incident light, the left-handed circularly polarized component of the incident light having the wavelength of $\lambda$ is reflected while the right-handed circularly polarized component passes through. The light having any other wavelength passes through. For instance, when a cholesteric liquid crystal material having a property to reflect red light having the wavelength of $\lambda_R$ is placed on a material which absorbs light in the visible range, and a random light such as sunlight is radiated thereon, the transmitted light is all absorbed, and only a left-handed circularly polarized light having the wavelength of $\lambda_R$ is reflected so that the cholesteric liquid crystal material emits bright red light.

A cholesteric liquid crystal material has the property to change color depending on the viewing angle. When the incident angle to the plane of the cholesteric liquid crystal material is $\theta$, the difference in the length of the light path between the upper surface and the bottom surface of each layer or for each pitch is $2p \cdot \cos\theta$. If this difference is a multiple of the wavelength $\lambda$ ($2p \cdot \cos\theta = n\lambda$ where n is an integer), the components of the light reflected by the upper surface and the bottom surface of each layer reinforce each other. Therefore, as the incident angle gets shallower, a light component having a progressively shorter wavelength is amplified, and the reflected light turns from red to blue.

A cholesteric liquid crystal material having a low molecular weight tends to be sensitive to temperature, an electric field and a magnetic field, and often changes color when affected by such influences. However, a cholesteric liquid crystal material having a high molecular weight is highly stable, and is much less affected by such influences. A high-polymer cholesteric liquid crystal material which has a desired layer pitch and a high level of stability can be obtained by coating a liquid crystal material over PET film, and applying a temperature, an electric field, a magnetic field, a pressure, and additives.

Hologram, which can be given with a prescribed optical property according to the spacing of grooves formed on a surface plane, can be relatively easily duplicated only if a technology for forming fine groove is available. On the other hand, as the optical property of a high-polymer cholesteric liquid crystal material is determined by a three dimensional arrangement of molecules, it is much more difficult to duplicate as it requires a high level of technology for preparing the material, and properly processing it. Therefore, by using such properties of the high-polymer cholesteric liquid crystal material for identification, it is possible to improve the identifiability and prevent the forgery of cards, passports, security notes, gift certificates and so on.

Hologram typically comprises a hologram forming layer which has diffractive grating of various pitches formed thereon and a metallic reflective layer on one side thereof. The light reflected by this reflective layer diffracts into various different directions depending on the pitches thereof so that a different view is created depending on the viewing angle. Typically, the hologram changes color, and shows a three-dimensional view as the viewing angle changes. According to the present invention, the identifiability is enhanced by forming the reflective layer of the hologram with a cholesteric liquid crystal material, and taking advantage of the optical properties of the hologram and the cholesteric liquid crystal material.

BRIEF SUMMARY OF THE INVENTION

In view of such problems of the prior art, and the recognition by the inventors, a primary object of the present invention is to provide an optical identification system which is effective in preventing forgery, and economical to implement.

A second object of the present invention is to provide an optical identification system which is effective in preventing forgery, and reliable in use.

A third object of the present invention is to provide an optical identification system which can be affixed to a wide range of articles without any difficulty.

According to the present invention, these and other objects can be accomplished by providing a system for identifying an authenticity of an article by optically recognizing a identification medium affixed to the article, characterized by that: the identification medium includes a high-polymer cholesteric liquid crystal material which reflects a single wavelength or a plurality of wavelengths.

Typically, the identification medium is transparent besides from the light of the particular wavelength which is reflected by the identification medium so that the application of the identification medium to an article would not substantially affect the appearance of the article. In particular, the surface markings and other features of the article shows through the identification medium, and it is desirable in view of both appearance and security. When the identification medium is adapted to reflect non-visible light such as infrared light, the identification medium can be made totally transparent to the viewer.

Because cholesteric liquid crystals selectively reflect a certain wavelength, and this wavelength changes with the change in the angle of the incident light, the identification medium produces a distinctive hue which changes with the viewing angle, and thereby provides a favorable means for identification. This can be also automatically detected by using a color filter for a prescribed wavelength. A highly accurate detection is possible by using a filter including high-polymer cholesteric liquid crystal material which has identical optical properties as the identification medium.

Also, cholesteric liquid crystals selectively reflect a circularly polarized light of either sense, and this distinct property can be readily detected by using a detecting device including a wave plate and a polarizing filter.

When high-polymer cholesteric liquid crystals of at least two different kinds are arranged in an overlapping relationship, light resulting from the combination of the light reflected by the two layers of different high-polymer cholesteric liquid crystals is emitted from the surface of the identification region. Therefore, it can be detected by using an appropriate detecting device, and a high level of security can be achieved. High-polymer cholesteric liquid crystals of at least two different kinds may be arranged in two mutually adjacent regions. In this case, if they reflect light of the same wavelength, but the reflected light is circularly polarized in different senses, the identification medium looks visually uniform, but it is possible to distinguish one of the regions by using a detecting device including a polarizing filter and a wave plate.

It is also possible to arrange a plurality of regions, and to form at least one of the regions with a high-polymer cholesteric liquid crystal material so that the authenticity of the article may be identified by recognizing a pattern in the arrangement of the high-polymer cholesteric liquid crystal material. For instance, the pattern in the arrangement of the high-polymer cholesteric liquid crystal material may be read as binary data so that the authenticity of the article may be verified by recognizing the binary data.

If the identification medium includes a diffraction grating such as a hologram using the high-polymer cholesteric liquid crystal material as a reflective layer thereof, such a combination of high-polymer cholesteric liquid crystals and diffraction grating provides symbiotic advantages in terms of security and ease of verification. For instance, the detecting device may further include a light source while the light receiving device includes a plurality of light receiving portions arranged around the light source so that a direction of light reflected from the identification medium may be detected from an intensity of light received by each of the light receiving portions.

To avoid tampering, the identification medium may be adapted to be either entirely or partly destroyed when an attempt is made to peel off the medium from the article. It can be achieved by making the main part of the identification medium less strong than the bonding layer attaching the identification medium to the article.

The present invention also provides a method for identifying the authenticity of an article, comprising the steps of: radiating light from an external light source upon an identification medium attached to an article via a polarizing filter and a wave plate, the identification medium including a diffraction grating having a reflective layer formed with a high-polymer cholesteric liquid crystal material; and receiving or visually viewing light reflected therefrom via the polarizing filter and the wave plate so that the authenticity of the article may be verified by recognizing a graphic or other pattern recorded in the diffraction grating.

BRIEF DESCRIPTION OF THE DRAWINGS

Now the present invention is described in the following with reference to the appended drawing, in which.

DETAILED DESCRIPTION OF THE PREFERRED EMBODIMENTS

Figure 1:
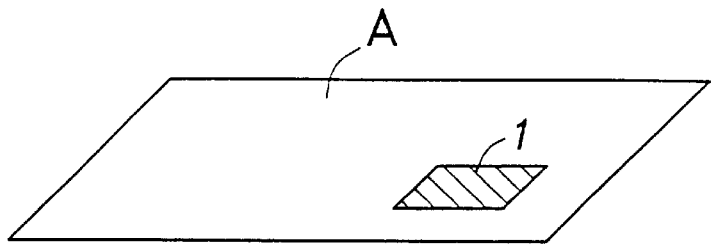
FIG. 1 is a perspective view showing an article carrying an identification medium according to the present invention.
Figure 18:
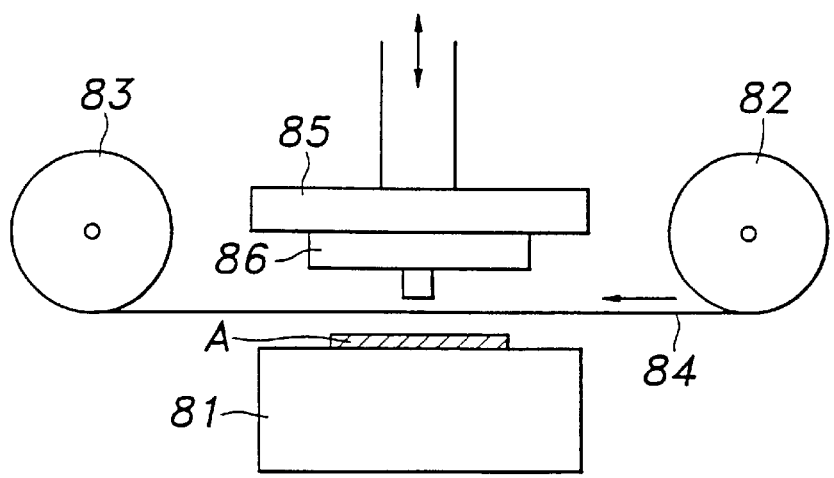
FIG. 18 is simplified side view showing a hot stamping device.

Referring to FIG. 1, an identification foil 1 having a high-polymer cholesteric liquid crystal material having a layer pitch of p applied thereon is affixed to a selected location, two or more locations or the entire surface of an article A such as a card, passport, security note or gift certificate, by a hot stamping process. The hot stamping process consists of transferring an ornamental film onto the surface of an article with an instantaneous application of heat and pressure by using a device as shown in FIG. 18. More specifically, an article A is mounted on a holder 81, and hot stamping foil 84, which is paid out from a feed roll 82 and is wound on a winding roll 83, is pressed onto the article A by a male metallic die 86 which is actuated by an actuator such as a cylinder not shown in the drawing, and heated by a heating plate 85. The hot stamping foil 84 is typically provided with a laminated structure having a base film, a peel layer, a protective layer, a metallic film layer and a bonding layer, in that order. When this hot stamping foil is pressed, the resulting pressure and heat separates the protective layer, the metallic film layer having a high-polymer cholesteric liquid crystal material deposited thereon and a bonding layer from the base film, and transfers them onto the article, thereby causing the identification foil 1 to be attached to the article A. If desired, the protective layer may serve the dual purpose of the peel layer and the protective layer. The identification foil 1 or the high-polymer cholesteric liquid crystal material applied thereon can be read and recognized either visually or by using a machine. The method for attaching the identification foil 1 serving as a identification medium onto the article may consist of a heat seal process or a manual application of roll film, instead of the hot stamping process.

Embodiment 1

Figure 2:
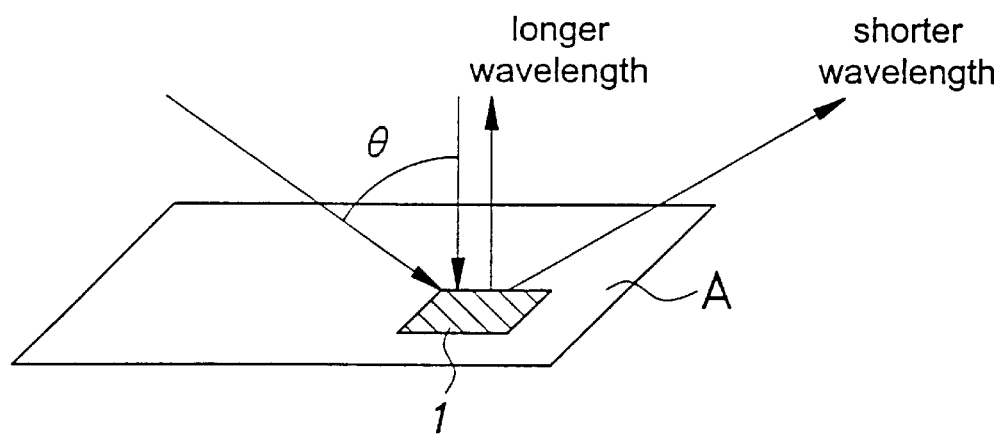
FIG. 2 is a perspective view showing a first embodiment of the identification system according to the present invention.

Referring to FIG. 2, an identification foil 1 serving as a identification medium having a high-polymer cholesteric liquid crystal material applied thereon according to the present invention is transferred onto or attached onto the surface of an appropriate location on the article A.

When this assembly is exposed to light, a certain color corresponding to the property of the liquid crystals is reflected from the surface. It is then detected either visually or by using a machine for verifying the authenticity of the article. Because a similar effect may be produced even by applying (or printing) normal ink, it is preferable to change the angle of the incident light with respect to the surface of the liquid crystal material, and to take into account the change in color for the verification. The wavelength of the light which is amplified gets continually shorter or the reflected light changes color with the increase in the angle of the incident light θ with respect to the line perpendicular to the plane of the surface of the liquid crystal material so that this information can be used for improving the reliability of the verification process. Obviously, when normal ink is used, there is no change in the wavelength (or color) of the reflected light with the change in the incident angle.

The reflected light was used for the purpose of identification in this embodiment, but when the identification foil is affixed to a transparent object, the transmitted light may also be used for identification purpose.

Embodiment 2

Figure 3:
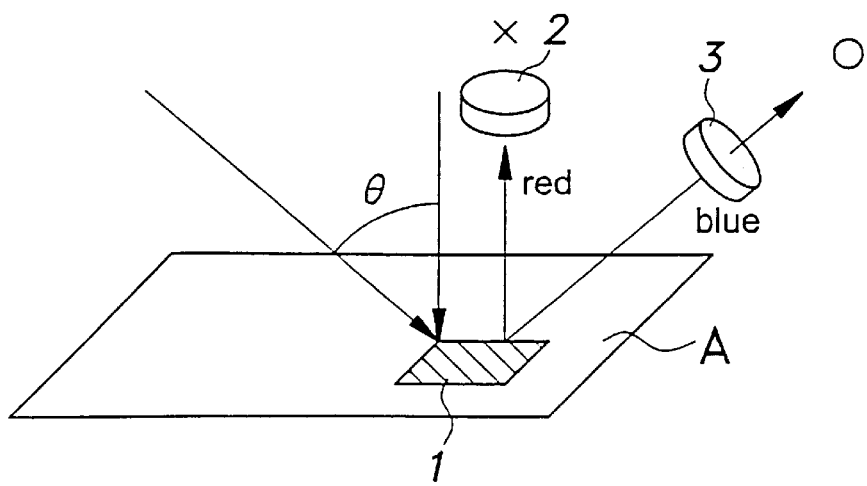
FIG. 3 is a perspective view showing a second embodiment of the identification system acccording to the present invention.

Referring to FIG. 3, in this embodiment, for identification purpose, a identification foil 1, having a high-polymer cholesteric liquid crystal material applied thereon, thereby serving as a identification medium, is transferred onto or bonded onto a suitable location on the article A. A filter 2 for shutting off the wavelength which is reflected by this liquid crystal material is placed immediately over this identification foil 1, and a similar filter 3 is placed for a reflected light beam which is at an angle θ with respect to the direction perpendicular to the foil 1.

When a random light is radiated upon this foil from above, if the liquid crystal material has the property to reflect red light, the reflected light does not pass through the filter 2, thereby producing a dark view through the filter 2, but the light which is reflected in the direction at the angle θ with respect to the direction perpendicular to the identification foil 1 is amplified at a shorter wavelength component thereof (bluish color) so that the reflected light passes through the filter 3, and produces a bright blue view through the filter 3. This can be visually recognized for the verification of the authenticity, but light detecting devices may also be placed at locations corresponding to the directions of the reflected light for detecting the intensities of the reflected light in the corresponding directions to thereby determine the authenticity.

Embodiment 3

Figure 4:
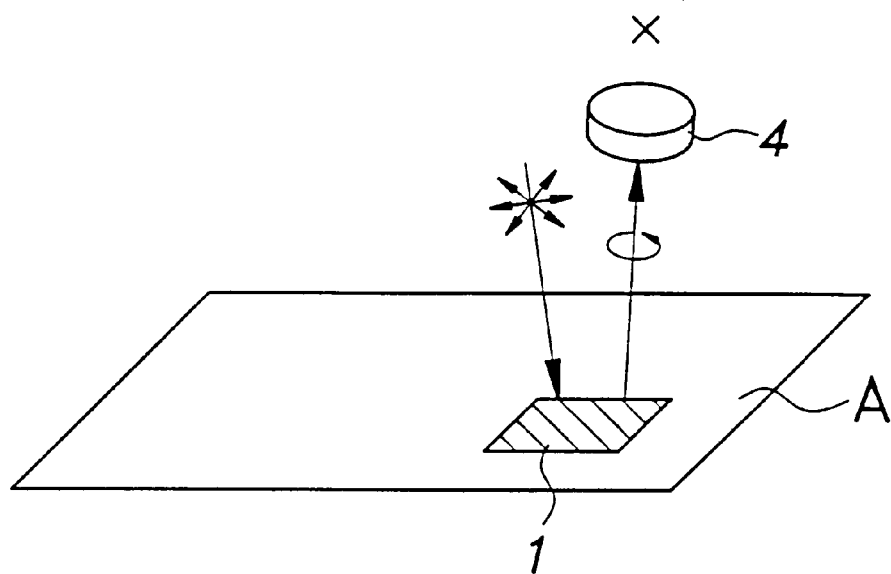
FIG. 4 is a perspective view showing a third embodiment of the identification system according to the present invention.

Referring to FIG. 4, in this embodiment, for identification purpose, an identification foil 1, having a high-polymer cholesteric liquid crystal material applied thereon, thereby serving as a identification medium, is transferred onto or bonded onto a suitable location on the article A. The light reflected by the identification foil 1 is passed through a filter 4 having identical characteristics to those of the high-polymer cholesteric liquid crystal material applied on the identification foil 1 or having the property to reflect only the component of light which has a same wavelength and a rotational polarization of a same sense as those of the light reflected by the identification foil 1.

When random light is radiated upon this identification foil 1, the reflected light would not pass through the filter 4 because the reflected light has only a certain wavelength and is circularly polarized in one direction. This reflected light therefore cannot pass through the liquid crystal filter 4 although a reflected light of a prescribed color is visible it were not for the filter 4. The authenticity can be verified by visually detecting this difference, but light detecting devices may also be placed at locations corresponding to the directions of the reflected light to compare the intensities of the received light with and without the filter, and to determine the authenticity from the difference in the intensities of the received light.

Embodiment 4

Figure 5:
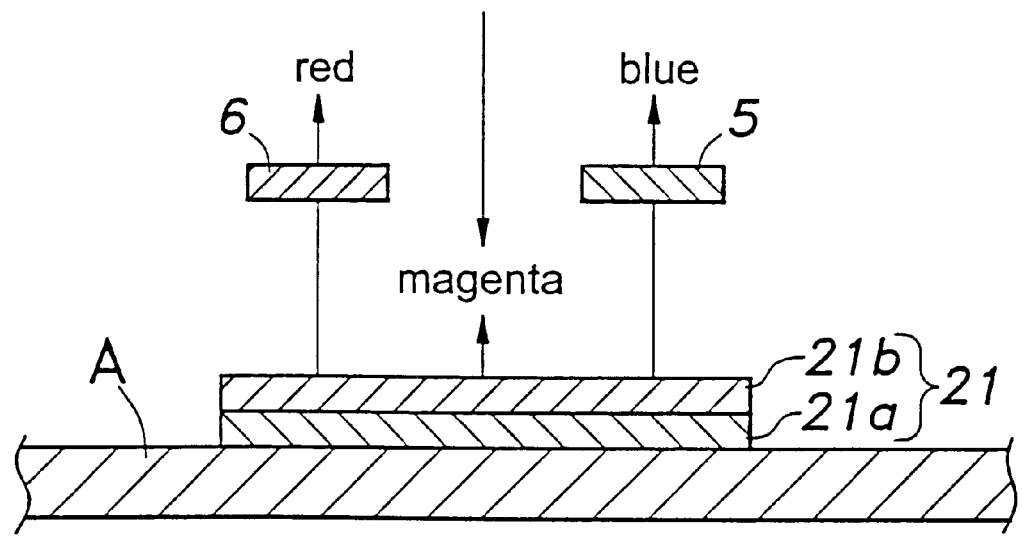
FIG. 5 is a perspective view showing a fourth embodiment of the identification system according to the present invention.

Referring to FIG. 5, an identification foil 21 having high-polymer cholesteric liquid crystal materials 21a and 21b of two different kinds applied thereon one over the other is transferred onto or attached to a suitable location on an article A.

For identification purpose, liquid crystal filters 5 and 6 having identical characteristics to those of the corresponding high-polymer cholesteric liquid crystal materials 21a and 21b, respectively, are arranged in locations through which the light reflected by the identification foil 21 passes.

For instance, the liquid crystal material 21a and the liquid crystal filter 5 reflect red light while the liquid crystal material 21b and the liquid crystal filter 4 reflect blue light. Thus, when random light is radiated upon the identification foil 21, the reflected light has a magenta color as a mixture of red and blue colors. Also, the reflected light shows a blue color when it passes through the liquid crystal filter 4, and a red color when it passes through the liquid crystal filter 5. The authenticity can be verified not only by visually detecting this difference, but also by detecting the two wavelengths with a machine and comparing them.

Embodiment 5

Figure 6A:
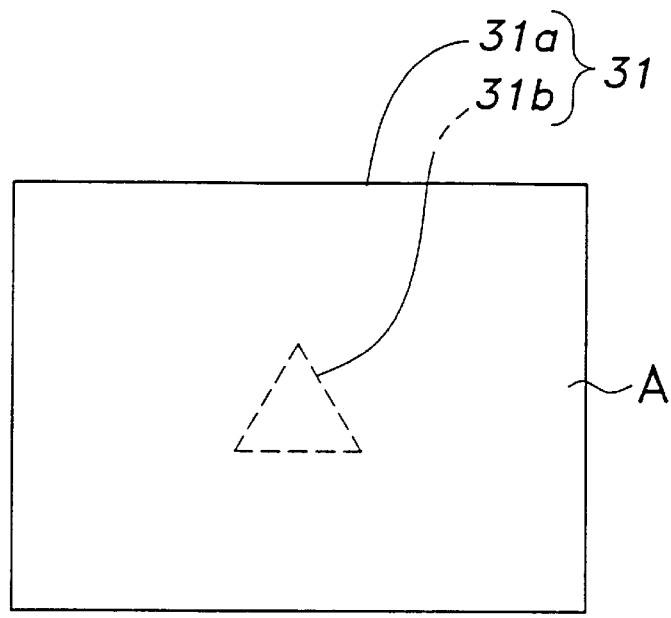
FIGS. 6a and 6b are schematic plan views showing the principle of a fifth embodiment of the identification system according to the present invention.

Referring to FIG. 6a, an identification foil 31, having high-polymer cholesteric liquid crystal materials 31a and 31b of two different kinds applied thereon in a nonoverlapping relation so as to define graphics, letters or patterns separately from each other, is transferred onto or attached to a suitable location on an article A. These liquid crystal materials 31a and 31b reflect light of an identical wavelength, but the light reflected from these materials is circularly polarized in two different directions. For instance, the liquid crystal material 31a reflects a right-handed circularly polarized component while the liquid crystal material 31b reflects a left-handed circularly polarized component.

Figure 6B:
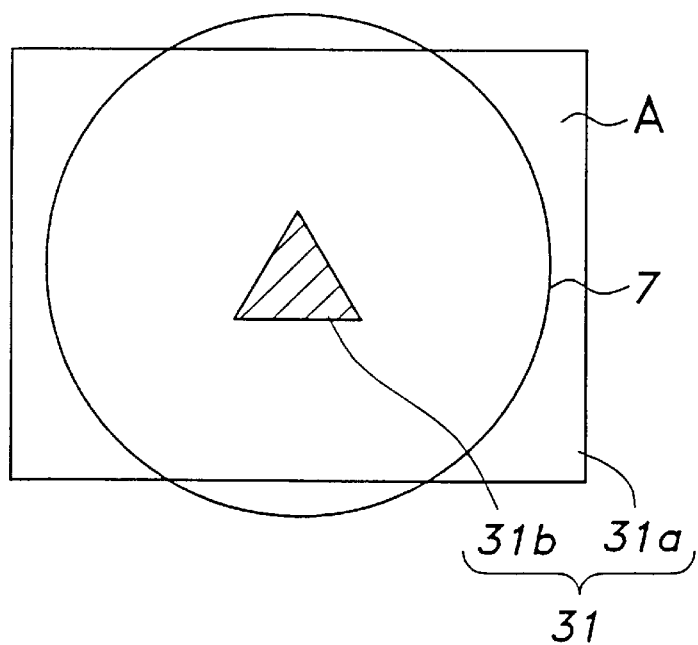

For identification purpose, a liquid crystal filter 7 having identical characteristics to those of either one of the liquid crystal materials 31a and 31b is placed in a path of light reflected from the identification foil 31 as shown in FIG. 6b.

When random light is radiated upon the identification foil 31, the reflected light is given with a color which corresponds to the reflected wavelength of either one of the liquid crystal materials 31a and 31b, but the distinction between the two liquid crystal materials 31a and 31b cannot be made as far as the color of the reflected light is concerned, and, hence, the graphics, letters or patterns are not visible. However, when the reflected light is viewed through the filter 7, the reflected light from either one of the liquid crystal materials 31a and 31b is shut off because of the difference in the direction of circular polarization, and the graphics, letters or patterns become visible. This can be visually recognized for verifying the authenticity of the article A.

Embodiment 6

Figure 7:
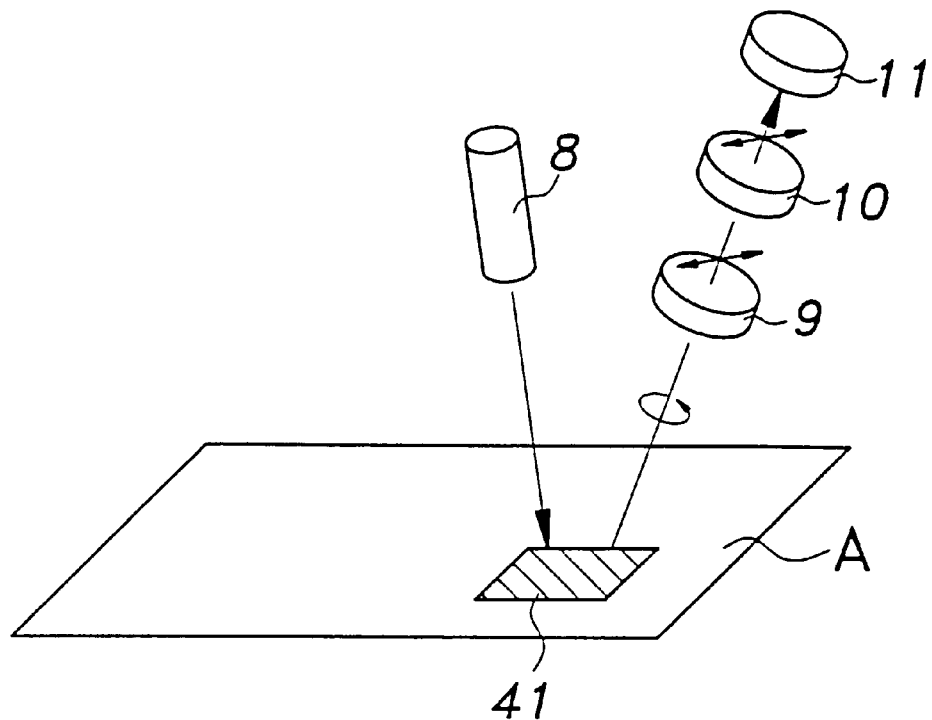
FIG. 7 is a perspective view showing a sixth embodiment of the identification system according to the present invention.
Figure 8:
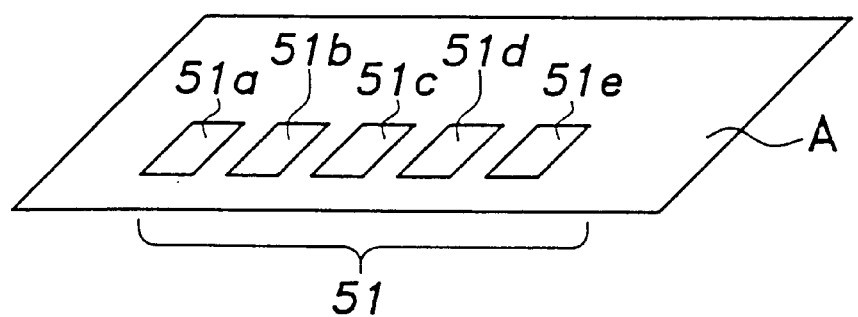
FIG. 8 is a perspective view showing a seventh embodiment of the identification system according to the present invention.

Referring to FIG. 7, in this embodiment, the high-polymer cholesteric liquid crystal material having a property to selectively reflect infrared light is applied on an identification foil 41 as a identification medium, and the identification foil 41 is transferred onto or attached to a suitable location on an article A. Therefore, the identification foil 41 looks transparent as it does not reflect any visible light.

As shown in FIG. 7, an infrared laser beam is produced from an infrared laser emitting device 8 and is impinged upon the identification foil 41. And in the path of the reflected light are arranged a quarter-wave plate 9, a polarizing filter 10, and a light receiving device 11, in that order.

For identification purpose, an infrared laser beam from the infrared laser emitting device 8 is impinged upon the identification foil 41, and the reflected light is converted into a linearly polarized light by the quarter-wave plate 9. And, the light transmitted through the quarter-wave plate 9 is received by the light receiving device 11 via the polarizing filter 10 placed on the optical path so that the authenticity can be determined from the intensity of the received light. According to this embodiment, the light detecting device which includes the quarter-wave plate 9, the polarizing filter 10, and the light receiving device 11 is sensitive only to the light which is circularly polarized in either direction, and can thus reliably detect the presence of an authentic identification foil without being interfered by light from other sources.

Embodiment 7

In this embodiment, identification foils 51a and 51c having high-polymer cholesteric liquid crystal materials applied thereon for reflecting infrared light, and transparent PET films 51b, 51d and 51e are arranged according to a prescribed rule, to jointly form a identification medium.

For identification purpose, the identification foil 51a, the PET film 51b, the identification foil 51c, the PET film 51d and the PET film 51e are sequentially scanned, and the reflected light is passed through the quarter-wave plate 9 and the polarizing filter 10 to be received by the light receiving device 11 in a similar fashion as Embodiment 6. Because only the light reflected by the identification foils 51a and 51c has a high intensity, binary data in the form of "10100" can be obtained where the value "1" is given when a high intensity exceeding a prescribed value is detected, and the value "0" is given in other cases. By comparing this data with reference data which is stored in advance, the authenticity can be determined. The number of possible variations of this data is $2^n-1$ where n is the number of foils and films.

It is also possible to replace the PET films with foils having high-polymer cholesteric liquid crystal materials which are different in properties from those of the foils 51a and 51c applied thereon so that binary data may be generated as described above by taking advantage of the difference in the properties of these high-polymer cholesteric liquid crystal materials.

Embodiment 8

Figure 9:
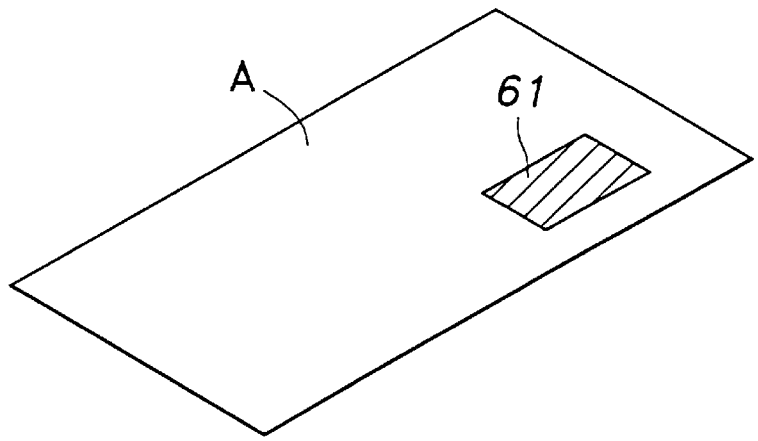
FIG. 9 is a perspective view showing an eighth embodiment of the identification system according to the present invention.
Figure 10:
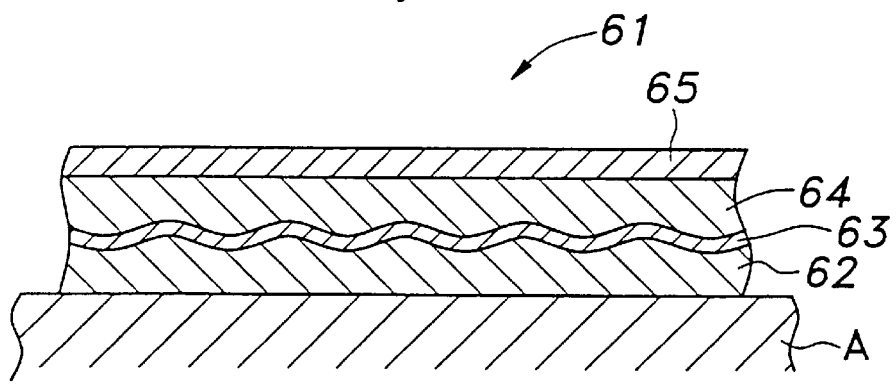
FIG. 10 is an enlarged sectional view of the structure of an identification medium according to the present invention.
Figure 11:
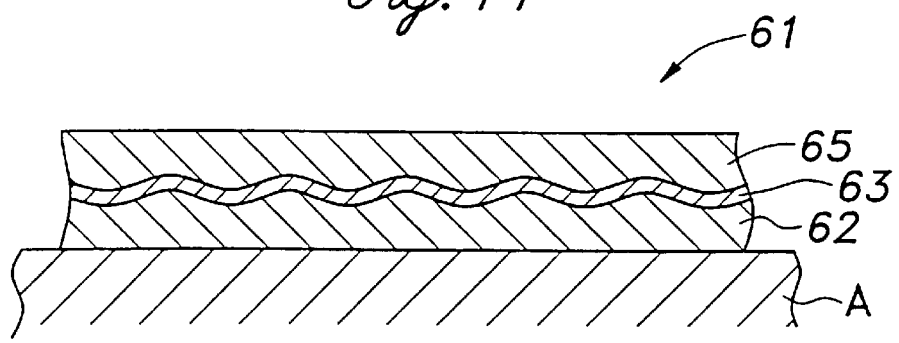
FIG. 11 is a view similar to FIG. 10 showing an alternate embodiment of the structure of an identification medium according to the present invention.

Referring to FIG. 9, a hologram foil 61 is affixed to a selected location, two or more locations or the entire surface of an article A such as a card, passport, security note or gift certificate, by a hot stamping process. The hot stamping process consists of transferring an ornamental film onto the surface of an article with an instantaneous application of heat and pressure as mentioned earlier. As shown in FIG. 10 in an enlarged scale, the hologram foil 61 is formed by laminating a bonding layer 62, a high-polymer cholesteric liquid crystal material layer 63 serving as a reflective layer, a hologram forming layer 64 and a protective layer 65 on the surface of an article A, and is adapted to be transferred onto the article A by the protective layer 65 serving as a peel layer separating the hologram foil 61 from a base film not shown in the drawing by heat and pressure during the hot stamping process. If desired, the hologram forming layer 64 may be omitted as illustrated in FIG. 11 because the protective layer 65 can serve also as the hologram forming layer as well as the protective layer. If desired, the peel layer may be provided separately from the protective layer 65.

The hologram foil 61 affixed to the article can be read and recognized either visually or by using a machine. The method for attaching the hologram foil 61 serving as a identification medium onto the article may consist of a heat seal process or a manual application of roll film, instead of the hot stamping process.

Cholesteric liquid crystals have the property to reflect only the light which has a certain wavelength (for instance λ1 or green) and is circularly polarized in either direction (for instance right-handed), and transmits the light which has other wavelength or is circularly polarized in the other direction). By using a cholesteric liquid crystal layer 63 as the reflective layer for the hologram, and recording letters or other patterns in the hologram, these patterns become visible by glowing in a green color (or at the wavelength of λ1) only when viewed from a certain angle with the light radiated from a light source (for instance from a fluorescent lamp) being diffracted by the hologram foil 61. This allows the authenticity of the article to be verified. Because only a portion of the light radiated thereupon is diffracted by the cholesteric liquid crystal material layer 63, if there is any graphic pattern on the surface of the article underneath the hologram foil 61, such a graphic pattern normally shows through. In other words, the hologram foil 61 normally looks substantially transparent.

Therefore, the hologram foil 61 is normally transparent, and shows through the pattern on the surface of the article (such as a gift certificate), but when viewed from a certain angle, the pattern of the hologram in the color of the wavelength of λ1 becomes visible.

Embodiment 9

Figure 12:
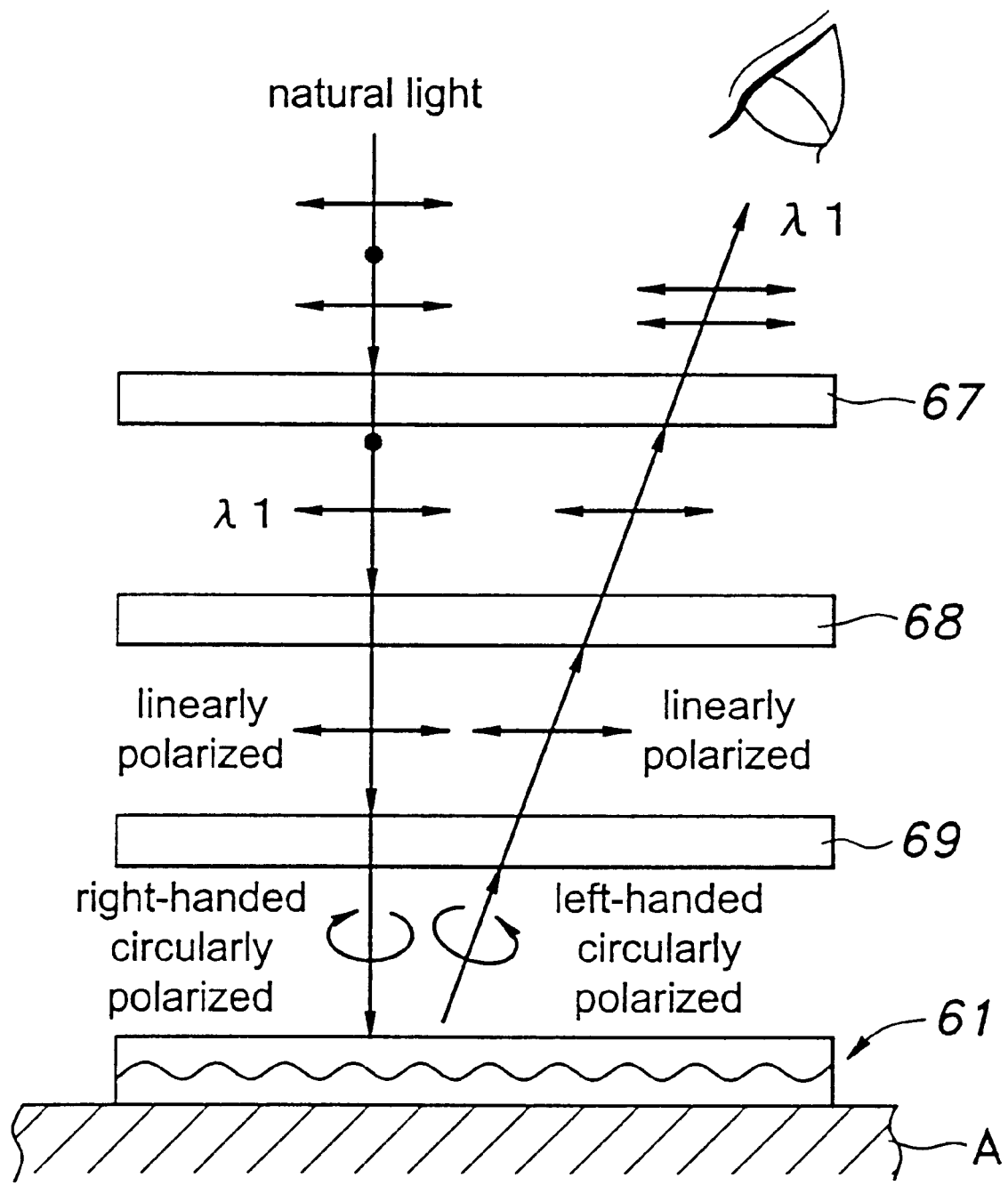
FIG. 12 is a side view showing a ninth embodiment of the identification system according to the present invention.

The reliability of the authenticity verification may be improved by an alternate embodiment of the present invention which is described in the following. Referring to FIG. 12, a detecting device consisting of a band-pass filter 67, a polarizing filter 68 and a quarter-wave plate 69 may be arranged on the side of the light source. By applying this assembly to the hologram foil 61, natural light (sunlight, light from a fluorescent lamp and so on) is converted by the band-lass filter 67 into light having only the wavelength of λ1 (green), and then converted into a right-handed circularly polarized light by the polarizing filter 68 and the quarter-wave plate 69. When this light which has only the wavelength of λ1, and is circularly polarized in the right-handed direction is impinged upon the hologram foil 61, the cholesteric liquid crystals of the hologram reflects only the light which has the wavelength of λ1, and is circularly polarized in the right-handed direction. The reflected light is restored to the original linearly polarized light by the quarter-wave plate 69, and passes through the polarizing filter 68 and the band-pass filter 67. Thus, a clear image (hologram image) can be viewed only from a certain angle and through the detecting device. The light which has a different wavelength or is circularly polarized in the other direction is shut off by the band-pass filter 67 and/or the polarizing filter 68, and is prevented from reaching the hologram. Thus, when this assembly is placed over the hologram, only the pattern of the hologram which has a specific wavelength such as λ1 (green) becomes visible. The band-pass filter may be omitted without causing any significant changes in the operation, but provides the advantage of showing the hologram pattern with an improved clarity.

Figure 13:
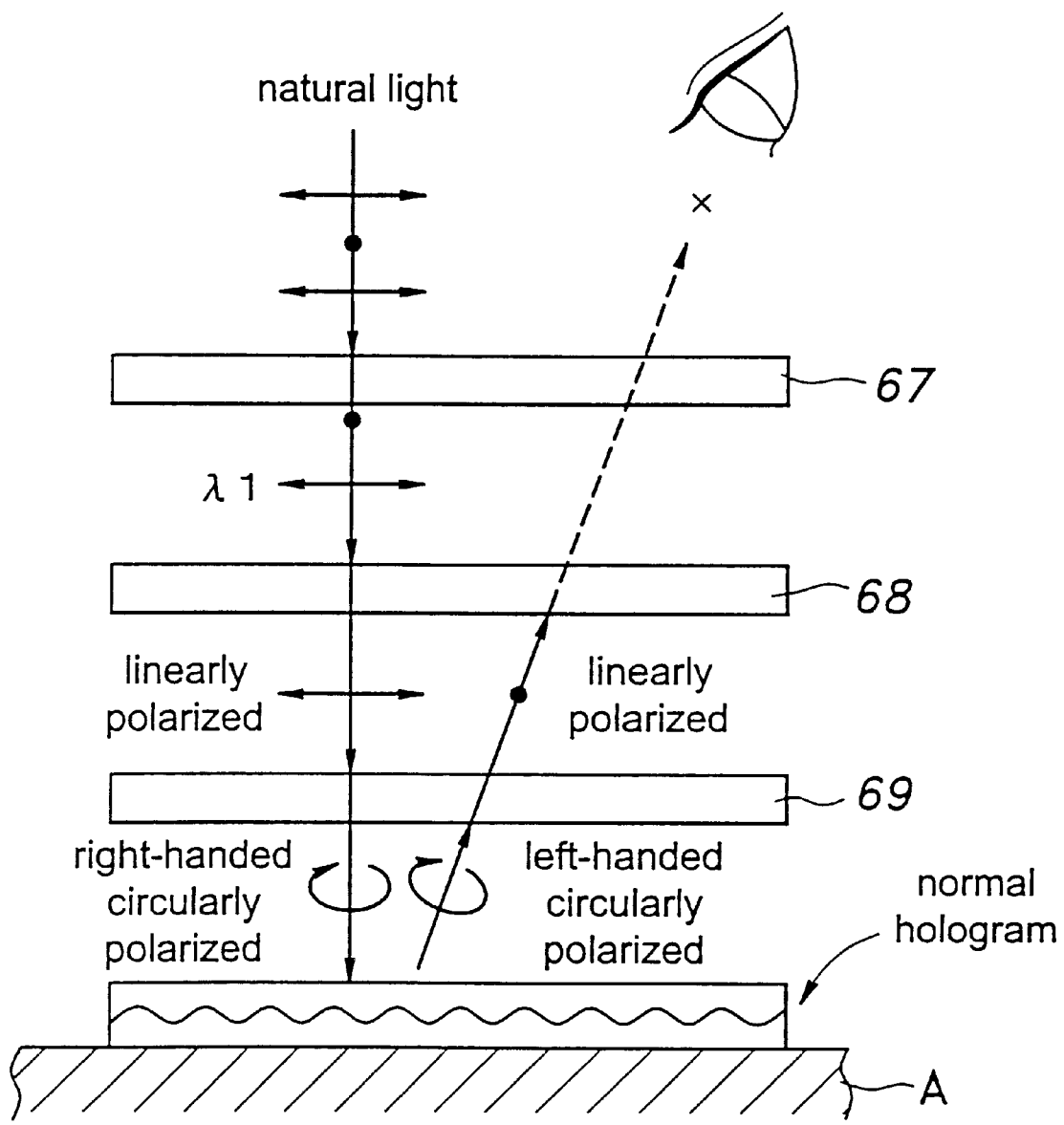
FIG. 13 is a view similar to FIG. 12 showing the operation of the identification system.

A normal surface such as a mirror surface and a surface of cholesteric liquid crystals reflect circularly polarized light in different ways. A normal surface converts a right-handed circularly polarized light into a left-handed circularly polarized light, but cholesteric liquid crystals reflect a right-handed circularly polarized light as a right-handed circularly polarized light. Therefore, even when the hologram has been illicitly duplicated, and a film reflecting the light of the same wavelength as the cholesteric liquid crystals is incorporated in the hologram, the reflected light is shut off by the polarizing filter 68 as shown in FIG. 13, and no light passes through.

Figure 14:
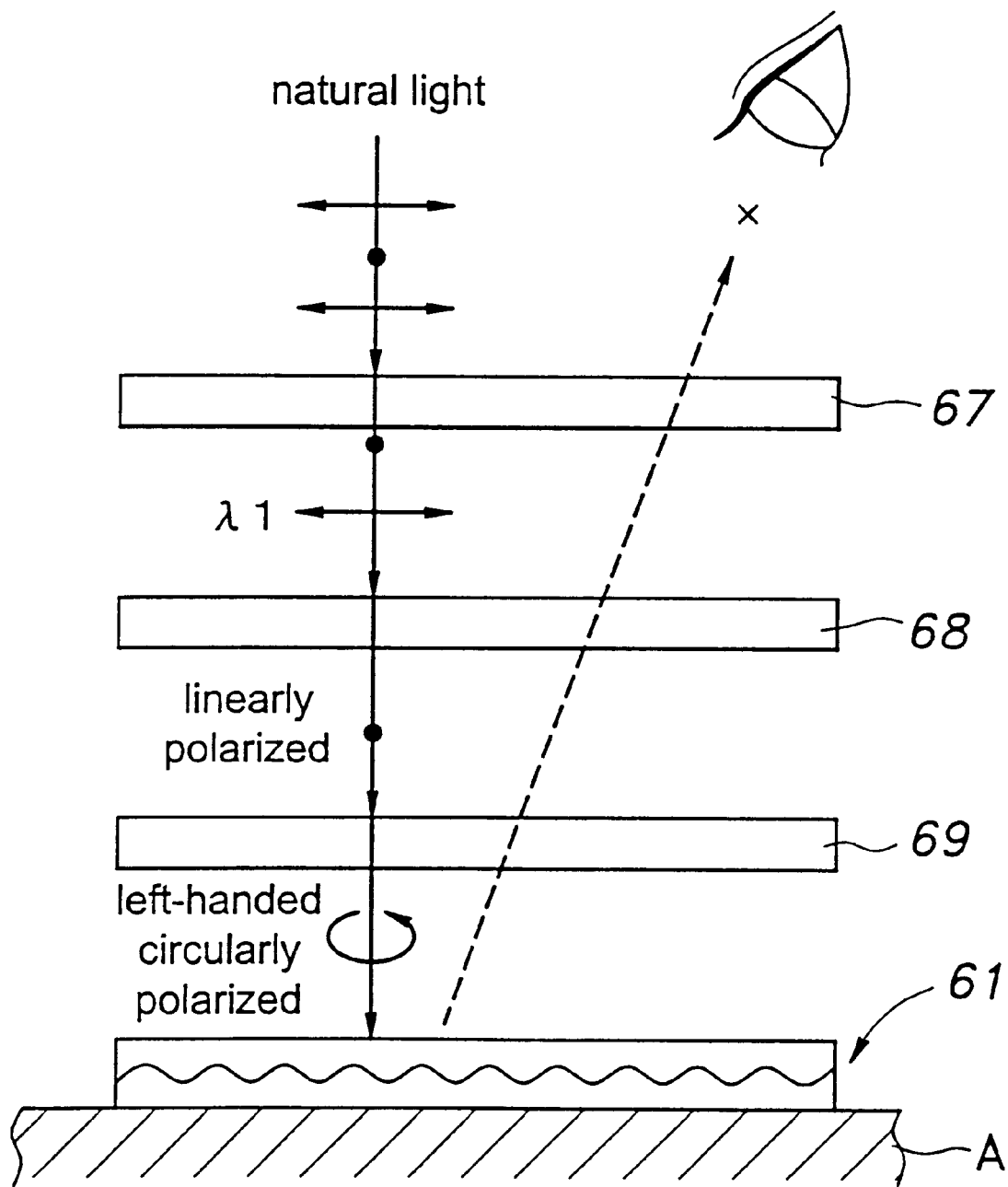
FIG. 14 is another view similar to FIG. 12 showing the operation of the identification system.

Also, the hologram becomes visible only when the circularly polarized incident light has the same sense as that of the liquid crystals of the hologram foil 61. As shown in FIG. 14, when a left-handed circularly polarized light is impinged upon the hologram foil 61, substantially no light is reflected by the hologram foil 61. Thus, by applying both of the identification methods illustrated in FIGS. 12 and 14, or identifying the pattern of the hologram by using incident light of two different properties one after the other, it is possible to enhance the level of security even further.

Embodiment 10

Figure 15:
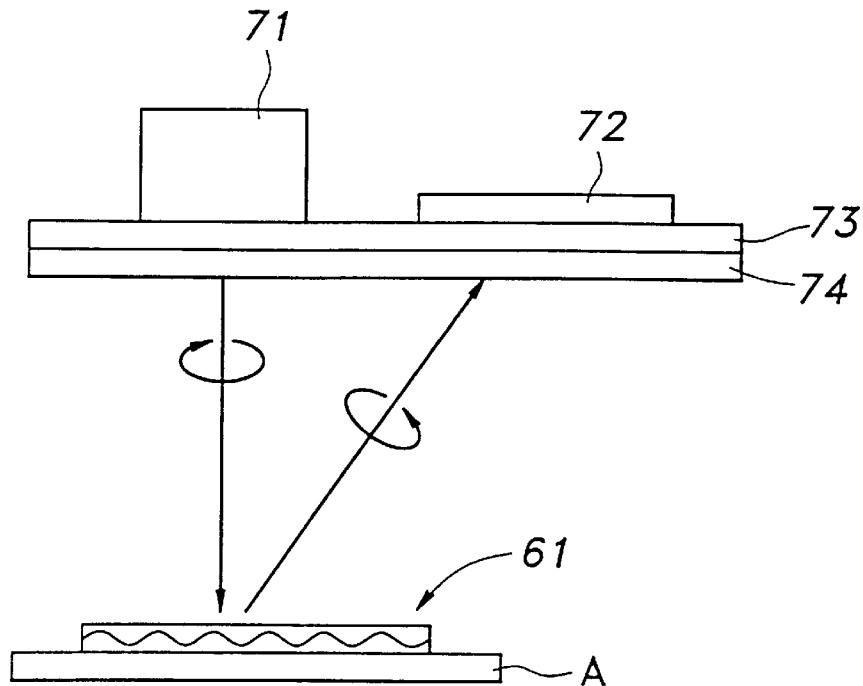
FIG. 15 is a side view showing a tenth embodiment of the identification system according to the present invention.

As a yet another alternate embodiment of the present invention, it is possible to automatically verify the authenticity of the article by using a verification device. Referring to FIG. 15, in addition to a light source 71 such as an LED or the like, light receiving device 72 such as a photodiode may be placed so as to capture a hologram image produced by the hologram foil 61. Similarly as the above described embodiment, a polarizing filter 73 and a quarter-wave plate 74 are placed in front of the light source 71 and the light receiving device 72. The authenticity of the hologram foil 61 can be therefore determined by evaluating the intensity of the light received by the light receiving device 72. Optionally, a band-pass filter may used similarly as the previous embodiment.

Embodiment 11

Figure 16:
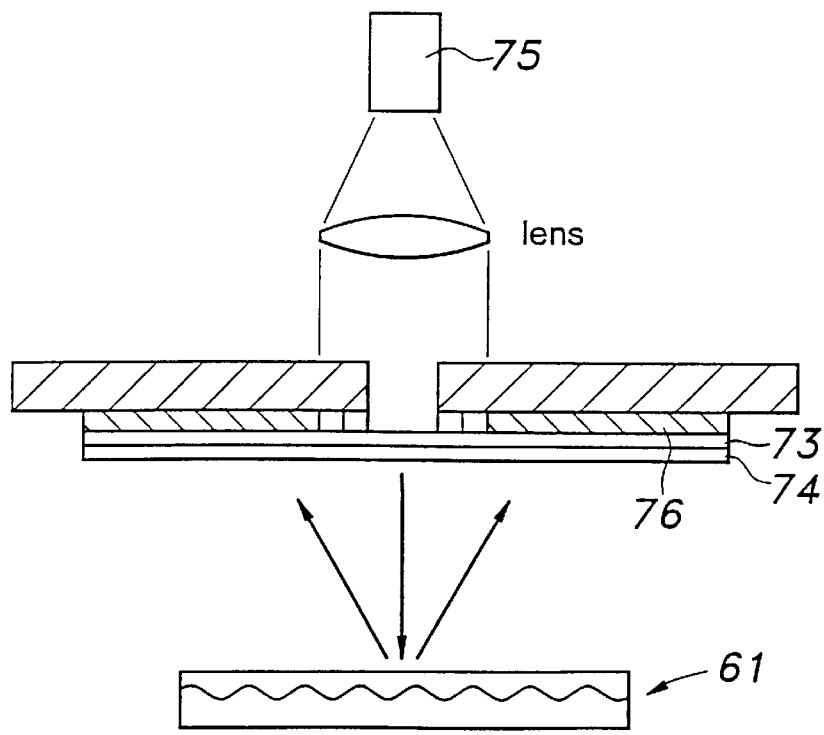
FIG. 16 a side view showing an eleventh embodiment of the identification system, according to the present invention.
Figure 17:
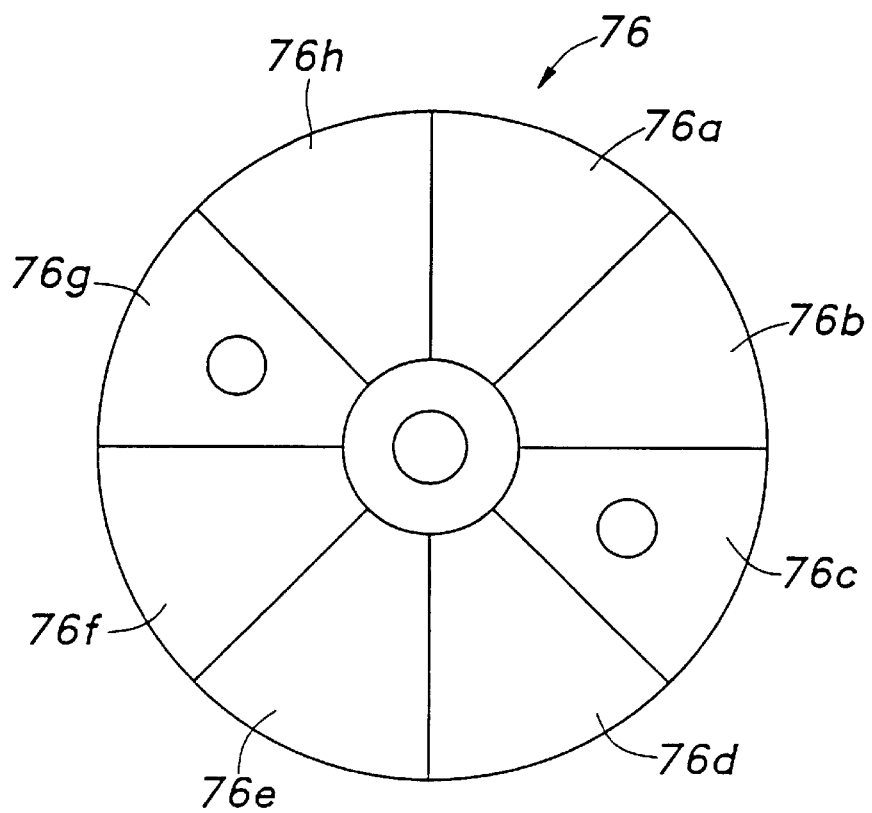
FIG. 17 is a plan view of the light source and the light receiving device shown in FIG. 16.

In case of the above described embodiment, as a similar detection result may be obtained even when a total reflection surface consisting of cholesteric liquid crystals is placed in place of the hologram foil 61 although the obtained intensity may be somewhat lower, it is possible to increase the reliability of the verification process by using a light receiving device including a plurality of light receiving portions 76a to 76h such as photodiodes surrounding the light source 75 as illustrated in FIGS. 16 and 17, and verifying the authenticity of the hologram foil 61 serving as an identification medium according to the intensities of the light received by the prescribed ones (such as light receiving portions 76c and 76g) of the light receiving portions 76a to 76h corresponding to the hologram image produced from the hologram foil 61. In this case also, a polarizing filter 73 and a quarter-wave plate 74 should be placed in front of the light source 75 and the light receiving device 76. A band-pass filter may also be used, but it may also be omitted particularly if the light emitted from the light source consists of light of a single color which is reflected by the cholesteric liquid crystals, and even when a white light is used as the light source, a band-pass filter may be omitted because the light of other wavelength is substantially shut off by the polarizing filter by virtue of the polarizing filter and the quarter-wave plate.

The wavelength of the light reflected by the cholesteric liquid crystals consisted of light having a wavelength of λ1 (green), but light of other wavelength can also be used. In particular, when cholesteric liquid crystals which reflect light outside the visible light range (such as infrared light) are used, the hologram appears transparent, and the existence of an identification medium can be detected only when a detecting device is used. Thus, the identifiability of the article can be enhanced even further. In the above described embodiments, the identification foils consisted of holograms made of cholesteric liquid crystals, but may also consist of diffraction grating made of cholesteric liquid crystals. As a matter of fact, a hologram can be considered as a special type of diffraction grating.

By making the cholesteric liquid crystal material layer and/or the hologram forming layer less stronger than the bonding layer, the illicit reuse of the hologram can be avoided because the cholesteric liquid crystal material layer or the hologram forming layer is destroyed when an attempt is made to peel off the hologram foil once the hologram foil is attached to an article.

As described above, according to the present invention, by using a high-polymer cholesteric liquid crystal material which reflects a single wavelength or a plurality of wavelengths, it is possible to improve the performance in preventing forgery by making duplication difficult and verification of authenticity easy as well as to achieve high levels of identifiability and stability. Also, high-polymer cholesteric liquid crystal materials are relatively inexpensive so that the overall cost would not be significant. In particular, when the identification medium consists of a hologram or diffraction grating made of cholesteric liquid crystals, the level of security and identifiability can be improved even further.

When a hologram or diffraction grating made of cholesteric liquid crystals is used, a polarizing filter and a wave plate may be placed in a light path of the incident light and the reflected light to and from the identification medium in that order as seen from the incident light source, as required, and the hologram image obtained from the identification medium may be detected either visually or by using a detecting device so as to achieve an identification process which combines the polarizing properties of cholesteric liquid crystals and the diffracting properties of hologram as a symbiotic combination. Because this identification process uses the part of the incident light which has a prescribed wavelength and is particularly polarized, or the identification medium may be substantially transparent in a visible light range, the freedom in the design of the article is not impaired in any way. In particular, as a number of different identification methods (such as visual verification alone, using a polarizing filter and a wave plate in combination with a visual verification or a mechanical verification) can be used, the verification process can be readily adapted to the particular application and the available budget, and can thus provide a high level of versatility.

Although the present invention has been described in terms of preferred embodiments thereof, it is obvious to a person skilled in the art that various alterations and modifications are possible without departing from the scope of the present invention which is set forth in the appended claims.

We claim:

1. A system for identifying authenticity of an article comprising:

an identification medium capable of being affixed to an article, said identification medium including a high-polymer cholesteric liquid crystal material which reflects a wavelength of light, wherein the authenticity of the article is determined by recognizing the optical properties of said liquid crystal material that are substantially unaffected by an electric or magnetic field.

2. A system for identifying an article according to claim 1, wherein light transmitted through or reflected by said identification medium is recognized or identified as it passes through a wave plate and a polarizing filter or a color filter.

3. A system for identifying an article according to claim 2, wherein said filter comprises a high-polymer cholesteric liquid crystal material.

4. A system for identifying an article according to claim 1, wherein high-polymer cholesteric liquid crystals of at least two different kinds are arranged in an overlapping relationship.

5. A system for identifying an article according to claim 1, wherein high-polymer cholesteric liquid crystals of at least two different kinds are arranged in two mutually adjacent regions.

6. A system for identifying an article according to claim 1, wherein said identification medium comprises a plurality of regions, at least one of said regions having a high-polymer cholesteric liquid crystal material applied thereon, and the authenticity of said article is identified by recognizing a pattern in the arrangement of said high-polymer cholesteric liquid crystal material.

7. A system for identifying an article according to claim 6, wherein said pattern in the arrangement of said high-polymer cholesteric liquid crystal material is read as binary data, and the authenticity of said article is verified by recognizing said binary data.

8. A system for identifying an article according to claim 1, wherein said identification medium includes a diffraction grating using said high-polymer cholesteric liquid crystal material as a reflective layer thereof.

9. A system for identifying an article according to claim 8, wherein said diffraction grating consists of a hologram.

10. A system according to claim 1, wherein said identification medium is adapted to be either entirely or partly destroyed when an attempt is made to peel off said medium from said article, a main part of said identification medium being less strong than a bonding layer attaching said identification medium to said article.

11. A system for identifying an article according to claim 1, further comprising a detecting device placed in a path of an incident light and a reflected light to and from said identification medium, said detecting device comprising a polarizing filter and a wave plate arranged in that order as seen from a source of said incident light.

12. A system for identifying an article according to claim 11, wherein said detecting device further comprises a band pass filter which is placed at a position in said light path of said incident light and said reflected light to and from said identification medium which is closer to said incident light source than said polarizing filter.

13. A system for identifying an article according to claim 11, wherein said detecting device further comprises a light receiving device.

14. A system for identifying an article according to claim 13, wherein said detecting device further includes a light source, and said light receiving device includes a plurality of light receiving portions arranged around said light source so that a direction of light reflected from said identification medium may be detected from an intensity of light received by each of said light receiving portions.

15. A method for identifying the authenticity of an article, comprising the steps of:

radiating light upon an identification medium attached to an article via a polarizing filter and a wave plate, said identification medium including a diffraction grating having a reflective layer formed with a high-polymer cholesteric liquid crystal material; and receiving or visually viewing light reflected therefrom via said polarizing filter and said wave plate so that the authenticity of said article may be verified by recognizing a graphic or other pattern recorded in said diffraction grating.

16. A system according to claim 1, wherein said wavelength changes in accordance with a change in the angle of an incident light, thereby producing a distinctive hue for identifying authenticity.

17. A system according to claim 1, wherein said liquid crystal material is substantially transparent so that the application of the identification medium to said article would not substantially affect an appearance of said article.

18. An identification article capable of being authenticated, comprising:

an article; and an identification medium, wherein said identification medium comprises a high-polymer cholesteric liquid crystal material affixed to said article, and wherein the authenticity of said article is determined by recognizing the optical properties of said liquid crystal material.

19. An identification article according to claim 18, wherein said identification medium further comprises:

a bonding layer formed on said article; and a hologram forming layer on said bonding layer, wherein said liquid crystal material is disposed between said bonding layer and said hologram forming layer.

* * * * *